(12) United States Patent
Dively

(10) Patent No.: US 7,361,832 B2
(45) Date of Patent: Apr. 22, 2008

(54) OUTDOOR ELECTRICAL ENCLOSURE AND HINGE-LESS DOOR ASSEMBLY THEREFOR

(76) Inventor: Robert C. Dively, 175 W. Landing, Williamsburg, VA (US) 23158

( * ) Notice: Subject to any disclaimer, the term of this patent is extended or adjusted under 35 U.S.C. 154(b) by 145 days.

(21) Appl. No.: 11/449,072

(22) Filed: Jun. 8, 2006

(65) Prior Publication Data

US 2007/0284370 A1 Dec. 13, 2007

(51) Int. Cl.
*H02G 9/00* (2006.01)
(52) U.S. Cl. .............. 174/38; 174/37; 174/39; 361/641; 52/3
(58) Field of Classification Search .......... 174/38, 174/39, 37, 58–60, 17 CT; 220/3.3, 484; 361/334, 641; 52/3
See application file for complete search history.

(56) References Cited

U.S. PATENT DOCUMENTS

| | | | |
|---|---|---|---|
| 3,341,268 A | 9/1967 | Bickford et al. | |
| 4,519,657 A | 5/1985 | Jensen | |
| 4,546,418 A | 10/1985 | Baggio et al. | |
| 4,785,376 A | 11/1988 | Dively | |
| D299,821 S | 2/1989 | Dively | |
| 4,873,600 A | 10/1989 | Vogele | |
| 4,951,182 A | 8/1990 | Simonson et al. | |
| 5,232,277 A | 8/1993 | Cassady | |
| 5,384,427 A * | 1/1995 | Volk et al. .................... | 174/38 |
| 6,362,419 B1 * | 3/2002 | Gallagher et al. ............ | 174/37 |
| 6,455,772 B1 * | 9/2002 | Leschinger et al. .......... | 174/38 |
| 6,667,437 B2 * | 12/2003 | Schenk ........................ | 174/38 |

* cited by examiner

*Primary Examiner*—Dhiru R. Patel

(57) ABSTRACT

A waterproof hinge-less door assembly is provided for an outdoor electrical enclosure, such as an electrical power pedestal. The electrical power pedestal includes a housing having an exterior and an opening, and an electrical component, such as a power receptacle, housed by the housing and accessible from the exterior of the housing through the opening. The hinge-less door assembly includes a mounting element coupled to the housing at or about the opening of the housing, a door operable among an open position in which access to the at least one electrical component is provided through the opening of the housing, and a closed position in which the door assembly provides a substantially weather-proof cover for the opening of the housing and the electrical component(s) housed by the housing, and a hinge-less coupling mechanism pivotably coupling the door to the mounting element. One or more weather shields provide further weather-resistance.

29 Claims, 3 Drawing Sheets

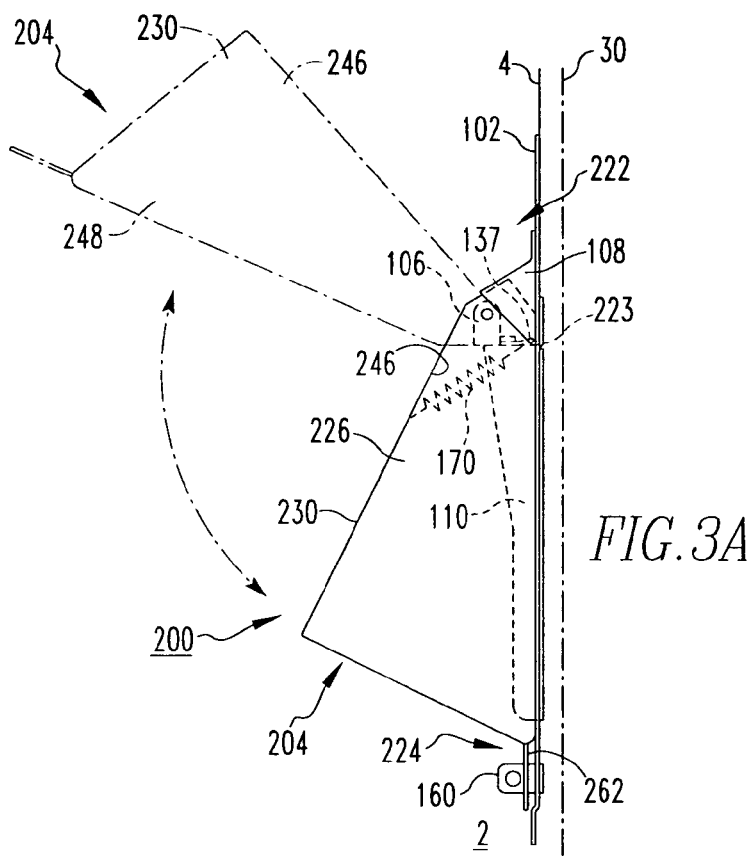
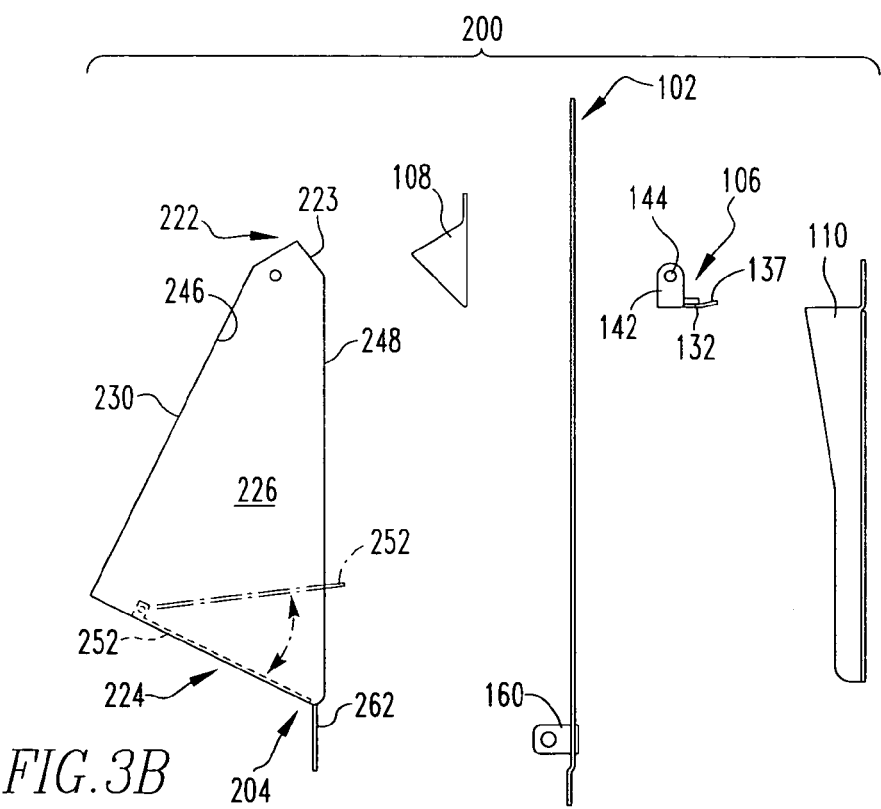

OUTDOOR ELECTRICAL ENCLOSURE AND HINGE-LESS DOOR ASSEMBLY THEREFOR

BACKGROUND OF THE INVENTION

1. Field of the Invention

The invention relates generally to outdoor electrical enclosures and, more particularly, to an outdoor electrical enclosure, such as an electrical power pedestal, which employs a door assembly. The invention also relates to door assemblies for outdoor electrical enclosures.

2. Background Information

Electrical components (e.g., without limitation, relays; circuit breakers; electric meters; transformers; light fixtures; power receptacles; telephones; telephone and/or internet service lines and electrical connectors therefor; television cables and electrical connectors therefor) used outdoors are typically housed within an enclosure, such as, for example, a housing, such as a box or cabinet, to protect the electrical components from the environment and to prevent electrical faults caused by moisture. In some applications, the outdoor electrical enclosure is mounted to another structure (e.g., without limitation, a panelboard mounted within a prepared opening in the wall of a building) whereas in other applications the outdoor electrical enclosure is free-standing, meaning that it is generally independent from other structures.

One type of free-standing outdoor electrical enclosure, which is generally old and well known in the art, is the electrical power pedestal. Electrical power pedestals generally comprise an upstanding housing, the base of which is disposed on a dock, a pier, or any other suitable foundation, and is structured to receive, for example and without limitation, power cables, telephone lines, television cables, internet service lines, and water service lines. The housing is made from a weather-resistant material, such as a suitable plastic or metal (e.g., without limitation, stainless steel), and is designed to enclose the power cables and lines, and the electrical components, receptacles and connectors which are electrically connected to the lines, in order to shield and protect them from the environment. Accordingly, electrical power pedestals are well suited for use in environments such as marinas and recreational vehicle (RV) parks, where they must remain outdoors exposed to environmental elements as they serve to provide plug-in power and/or connectivity (e.g., without limitation, telephone service; internet service; cable television), for example, for boats and RVs. Examples of electrical power pedestals are provided in U.S. Pat. Nos. 4,519,657; 4,546,418; 4,785,376; 4,873,600; and 4,951,182.

To provide the necessary degree of weather-resistance, the electrical components of the electrical power pedestal are typically covered by moisture-resistant access panels or doors, or they are disposed within a moisture-resistant compartment within the pedestal housing, with access to the compartment being provided by way of a moisture-resistant door. The doors are typically hinged to open and close, thereby providing access to the electrical components within the housing when necessary, while permitting them to remain covered and shielded from the environment when not in use. However, the hinges (e.g., without limitation, piano hinges) which are commonly employed to movably connect the access panels and/or doors are subject to a number of disadvantages, particularly in harsh weather environments.

For example, where it is cold and the electrical power pedestal and door hinges therefore are subject to freezing conditions, ice can form on the doors and hinges rendering them inoperable such that the electrical components within the electrical power pedestal are inaccessible. Even if the hinges do not freeze solid so as to lock the door closed, they can nonetheless collect snow, ice or other matter or debris which inhibits their operability, thus preventing the door from closing completely and thereby compromising the protection of electrical components which would otherwise be shielded by the door when the electrical power pedestal is not in use.

Another disadvantage of known door assemblies for electrical power pedestals is evident when the electrical power pedestal is subject to other weather conditions, such as, for example, a driving rain wherein the rain is falling at a significant lateral angle with respect to the ground. Under such circumstances, the electrical components of the electrical power pedestal can be undesirably exposed to moisture when the access door is opened, for example, in order to plug a power cord extending from the boat or RV into a power receptacle in the electrical power pedestal. More specifically, when the door is open and the power receptacle and/or other internal electrical components of the electrical power pedestal are in use, the electrical components remain at least partially exposed to the elements the entire time the boat or RV is connected to the electrical power pedestal.

There is a need, therefore, for a door assembly which will remain fully functional and effective, and which will continue to provide weather-resistance, even in the harshest of environments.

There is, therefore, room for improvement in outdoor electrical enclosures, such as electrical power pedestals, and in door assemblies for outdoor electrical enclosures.

SUMMARY OF THE INVENTION

These needs and others are satisfied by embodiments of the invention, which provide, for example, an outdoor electrical enclosure, such as an electrical power pedestal, having a hinge-less door assembly. The door assembly eliminates the use of conventional hinges in order to provide effective weather resistance even in the harshest of environments regardless of whether or not the electrical power pedestal is in use.

As one aspect of the invention, a door assembly is provided for an outdoor electrical enclosure. The outdoor electrical enclosure includes a housing having an exterior, and at least one electrical component housed by the housing. The housing has an opening for providing access to the electrical component from the exterior of the housing. The door assembly comprises: a mounting element structured to be coupled to the housing of the outdoor electrical enclosure at or about the opening of the housing; a door structured to cover the opening of the housing; and a hinge-less coupling mechanism pivotably coupling the door to the mounting element, wherein the door is operable among an open position in which access to the at least one electrical component is provided through the opening of the housing, and a closed position in which the door assembly provides a substantially weatherproof cover for the opening of the housing and the at least one electrical component housed by the housing.

The mounting element may comprise at least one weather shield which protrudes outwardly from the mounting element and the housing of the outdoor electrical enclosure in order to at least partially shield at least one of the opening of the housing of the outdoor electrical enclosure, the door, and the hinge-less coupling mechanism. The weather shield may comprise a hood coupled to the mounting element at or about the hinge-less coupling mechanism, wherein the hood at least partially overlays the hinge-less coupling mechanism and a portion of the door in order to resist the undesired entry of moisture or the undesired accumulation of ice. The weather shield may further comprise a side shield for shielding the opening of the housing and the at least one electrical component housed by the housing. When the door is in the closed position, at least one of the top of the door and the first side and the second side of the door may overlap the side shield in order to provide weather-resistance.

The hinge-less coupling mechanism may comprise a door mounting bracket and at least one pivot, wherein the door mounting bracket is coupled to the side shield at or about the top of the aperture of the mounting element, wherein the door mounting bracket includes a first end and a second end, and wherein the pivot pivotably couples the door to the first end and the second end of the door mounting bracket. The cover of the door may include a sloped portion, wherein when the door is in the closed position, the sloped portion of the door extends from the top of the door at an angle of about 20 degrees to about 50 degrees with respect to the vertical axis of the outdoor electrical enclosure housing. The door may further comprise a substantially planar edge, wherein when the door is disposed in the closed position, the substantially planar edge of the door is flush with at least one of the mounting element and the housing of the outdoor electrical enclosure, and wherein when the door is disposed in the open position, the substantially planar edge of the door forms an angle with respect to the vertical axis of the housing of at least about 90 degrees, thereby providing straight-in access to the opening of the housing.

The at least one electrical component housed by the housing of the outdoor electrical enclosure may comprise at least one power receptacle structured to receive a power conductor, and the cover of the door may include at least one aperture structured to receive the power conductor in order that the door remains in the closed position and substantially weatherproof regardless of whether or not the at least one power receptacle is in use. At least one animal shield may be pivotably coupled to the cover of the door at or about the aperture of the door cover in order to resist undesired access to the at least one power receptacle through the at least one aperture of the cover. The door may also be lockable when it is disposed in the closed position, and the door assembly may include a biasing member which biases the door towards the closed position in order to prevent the door from unintentionally opening.

As another aspect of the invention, an outdoor electrical enclosure comprises: a housing having an exterior and including an opening; at least one electrical component housed by the housing and being accessible from the exterior of the housing, through the opening; and a door assembly for covering the opening, the door assembly comprising: a mounting element coupled to the housing at or about the opening of the housing, a door operable among an open position in which access to the at least one electrical component is provided through the opening of the housing, and a closed position in which the door assembly provides a substantially weatherproof cover for the opening of the housing and the at least one electrical component housed by the housing, and a hinge-less coupling mechanism pivotably coupling the door to the mounting element.

The outdoor electrical enclosure may comprise an electrical power pedestal, and the at least one electrical component housed by the housing of the electrical power pedestal may be selected from the group consisting of a circuit breaker, a power line, a telephone service line, an internet service line, a television cable, a light fixture, and a power receptacle.

BRIEF DESCRIPTION OF THE DRAWINGS

A full understanding of the invention can be gained from the following description of the preferred embodiments when read in conjunction with the accompanying drawings in which:

FIG. 3A is a side elevational view of the hinge-less door assembly of FIG. 2, shown in solid line drawing in the closed position, and in phantom line drawing in the open position; and FIG. 3B is an exploded side elevational view of the hinge-less door assembly of FIG. 2.

DESCRIPTION OF THE PREFERRED EMBODIMENTS

Figure 1:
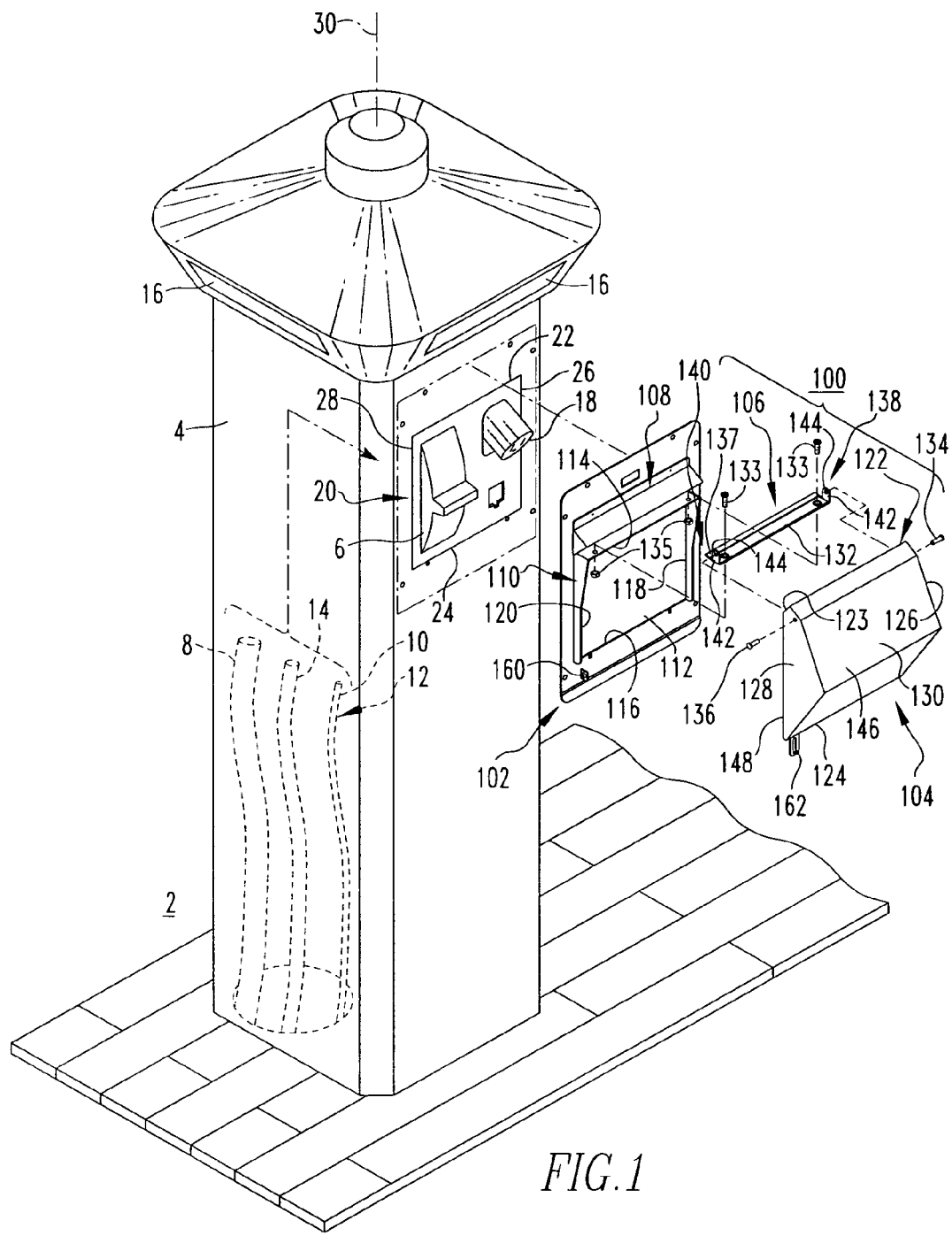
FIG. 1 is an exploded isometric view of an electrical power pedestal and a hinge-less door assembly therefore, in accordance with an embodiment of the invention.

For purposes of illustration, the invention will be described as applied to electrical power pedestals for enclosing electrical components (e.g., without limitation, relays; circuit breakers; electric meters; transformers; light fixtures; power receptacles; telephones; telephone and/or internet service lines and electrical connectors therefor; television cables and electrical connectors therefor), although it will become apparent that it could also be applied to any known or suitable type of enclosure adapted for outdoor weather-resistant use, whether or not such enclosure is free-standing or is mounted to another structure (e.g., without limitation, a building wall; a mounting post).

Directional phrases used herein, such as, for example, left, right, top, bottom, upward, downward, inward, outward and derivatives thereof, relate to the orientation of the elements shown in the drawings and are not limiting upon the claims unless expressly recited therein.

As employed herein, the term "outdoor electrical enclosure" refers to any known or suitable enclosure which is structured to house one or more electrical components (e.g., without limitation, a relay; a circuit breaker; an electric meter; a transformer; a light fixture; a power receptacle; a telephone; a telephone and/or internet service line and electrical connector therefore; a television cable and electrical connector therefore) for outdoor use, and expressly includes, without limitation, panelboards, switchgear cabinets, and "electrical power pedestals."

As employed herein, the term "electrical power pedestal" refers to an outdoor electrical enclosure which comprises a power center for providing plug-in power and/or connectivity (e.g., without limitation, telephone service; internet service; cable television). Such plug-in power and/or connectivity can be provided, for example, for a vehicle, such as for example and without limitation, a watercraft, such as a boat, wherein the electrical power pedestal is disposed at or about a body of water (e.g., without limitation, in a marina), and for a land-based vehicle, such as a recreational vehicle (RV), wherein the electrical power pedestal is disposed on a land-based foundation (e.g., without limitation, in a camp ground).

As employed herein, the phrase "conventional hinge" refers to any combination of interlocking components comprising the joint that traditionally permits a door to pivot with respect to the structure to which it is attached, and expressly includes, without limitation, piano hinges. Specifically, in a conventional hinge, a first interlocking component is attached to the door, and a second interlocking component is attached to the structure to which the door is movable attached. The complete set of first and second interlocking components is coupled together by way of a pivot member, such as a pin, which extends completely through the entire set.

As employed herein, the term "hinge-less" refers to any known or suitable coupling mechanism for pivotably coupling a door or panel member to a structure without the use of conventional hinges, as defined herein. For example, as discussed herein, in accordance with an embodiment of the invention, the door is pivotably coupled to the outdoor electrical enclosure using a hinge-less coupling mechanism which comprises a pair of pivot pins which engage a corresponding pair of apertures in protrusions of a door mounting bracket.

As employed herein, the term "fastener" refers to any suitable fastening, connecting or tightening mechanism expressly including, but not limited to, screws, bolts and the combinations of bolts and nuts (e.g., without limitation, lock nuts) and bolts, washers and nuts.

As employed herein, the term "tox-lock" refers to a fastening mechanism in which a mechanical weld is created by metal deformation such as, for example, at the corners, edge portions, and seams of a metallic enclosure or cabinet, which are folded and deformed to create mechanical welds therein, and/or between two or more metallic components which are pressed and deformed together in order to permanently join the components.

As employed herein, the statement that two or more parts are "coupled" together shall mean that the parts are joined together either directly or joined through one or more intermediate parts.

As employed herein, the term "number" shall include one or an integer greater than one (i.e., a plurality).

FIG. 1 shows an outdoor electrical enclosure, such as an electrical power pedestal 2, employing a hinge-less door assembly 100, which is substantially weatherproof. The housing 4 of electrical power pedestal 2 includes at least one opening, such as, for example and without limitation, the generally rectangular opening 20, shown. At least one electrical component, such as the circuit breaker 6, power conductor 8, telephone service line 10, internet service line 12, television cable 14, light fixture 16, and power receptacle 18 shown in the example of FIG. 1, are housed by the housing 4. One or more of the electrical components, such as circuit breaker 6 and power receptacle 18, are accessible from the exterior housing 4, through the opening 20. The door assembly 100 covers the opening 20.

Specifically, the door assembly 100 includes a mounting element 102 coupled to the housing 4 of the electrical power pedestal 2 at or about the opening 20, a door 104 structured to cover the opening 20, and a hinge-less coupling mechanism 106 for pivotably coupling the door 104 to the mounting element 102. The door 104 is operable among an open position (see door 204 shown in phantom line drawing in the open position in FIG. 3A) and a closed position (best shown in FIG. 2). When the door 104 is opened, access to the electrical components (e.g., without limitation, circuit breaker 6; power receptacle 18) is provided through opening 20 of the housing 4, and when the door 104 is disposed in the closed position, the door assembly 100 provides a substantially weatherproof cover for the opening 20 of the electrical power pedestal housing 4 and the electrical components 6,8,10,12,14,16,18 housed by the housing 4. Accordingly, as will be described in further detail herein, the door assembly 100 shields and protects the electrical components 6,8,10,12,14,16,18 from outdoor environment elements (e.g., without limitation, moisture; rain; sleet; snow; ice; dust; debris; particulate matter).

More specifically, the mounting element 102 of the door assembly 100 comprises at least one weather shield 108,110 which protrudes outwardly from the mounting element 102 and the electrical power pedestal housing 4 to which the mounting element 102 is coupled. In this manner, the weather shield(s) 108,110 shield the opening 20 of the housing 4, as well as the door 104 and the hinge-less coupling mechanism 106. The weather shield of the example door assembly 100, includes a hood 108 and a side shield 110. The hood 108 is coupled to the mounting element 102 at or about the hinge-less coupling mechanism 106 and partially overlays the hinge-less coupling mechanism 106 and a portion of the door 104, thereby resisting the undesired entry of moisture and/or the undesired accumulation of ice. This aspect of the door assembly 100 will be further appreciated with reference to FIGS. 2, 3A and 3B (discussed below), which illustrate a door assembly 200 which is substantially the same as door assembly 100, but further includes door apertures 250 and an animal shield 252.

Specifically, as best shown in solid line drawing in FIG. 3A, when the door 204 of the door assembly 200 is closed, hood 108 overlaps the top 222 of the door 204 and is disposed in close proximity to the top 222 of door 204, thereby resisting the undesired entry of moisture and the accumulation of ice which can result from the subsequent freezing of such moisture. More specifically, the hood 108 sufficiently overlaps top 222 of door 204 to prevent moisture caused, for example, by a wind-blown or driving rain (i.e., rain falling at a substantial angle with respect to the ground) from accessing the hinge-less coupling mechanism 106, and/or from entering opening 20 of the electrical power pedestal housing 4. In view of the close proximal relationship (i.e., minimal clearance) between the hood 108 and the top 222 of door 204, ice accumulation, if any, will be minimal. Moreover, any ice that does accumulate will be easily broken-up and removed during normal opening operation of the door 204. In other words, merely opening the door 204 will cause any ice to shear (i.e., break-away), thus falling away and permitting uninhibited full mobility of the door 204. It will be appreciated that the foregoing weather-resistant features are also exhibited by door assembly 100 in the embodiment shown and described in connection with FIG. 1, which is substantially the same.

Figure 2:
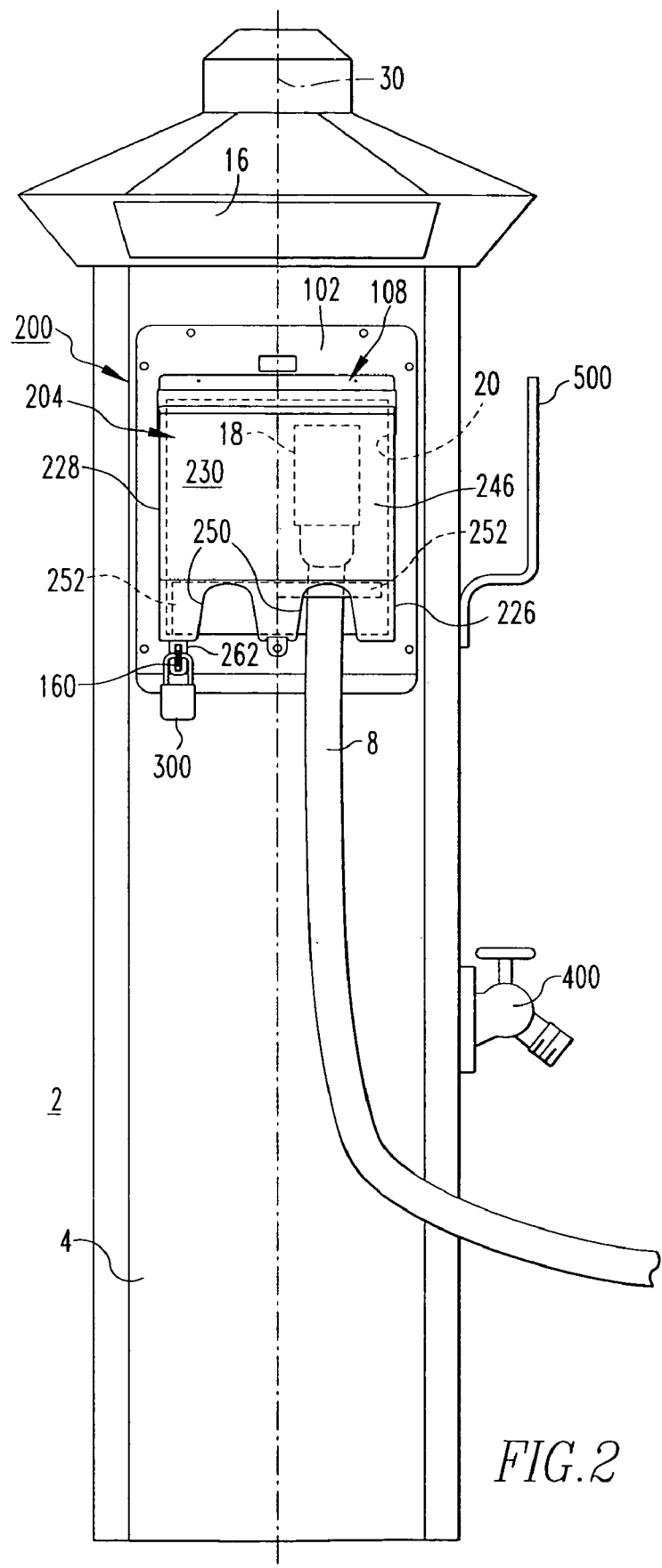
FIG. 2 is a side elevational view of an electrical power pedestal and hinge-less door assembly therefore in accordance with another embodiment of the invention.

Door assembly 100 of FIG. 1, and door assembly 200 of FIGS. 2, 3A and 3B both further include the aforementioned side shield 110, which provides additional weather-resistance. Specifically, as shown in FIG. 1, the generally rectangular opening 20 of housing 4 includes a top edge 22, a bottom edge 24, and first and second side edges 26,28, and the mounting element 102 includes an aperture 112 corresponding to the generally rectangular opening 20 of housing 4. In particular, the aperture 112 includes a top edge 114, a bottom edge 116, and first and second side edges 118,120. The side shield 110 is coupled to the mounting element 102 at or about the first and second side edges 118,120 of the mounting element aperture 112 and/or at or about the top edge 114 of the mounting element aperture 112. In this manner, the side shield 110, which protrudes outwardly from the mounting element 102, further shields the opening 20 of the electrical power pedestal housing 4 and the electrical components (e.g., without limitation, circuit breaker 6; power receptacle 18) housed thereby. Thus, the side shield 110 resists the entry of moisture along the first and second sides 26,28 and top edge 22 of the opening 20 in the electrical power pedestal housing 4 and, in particular, provides protection against the entry of moisture caused, for example, by a driving rain falling at a substantial angle with respect to the ground and thus contacting the first or second sides 126,128 of the door 104 and the side shield 110. The side shield 110 is also overlapped by the first and second sides 126,128 of the door assembly door 104 (best shown in hidden line drawing in FIG. 3A), which provides still further weather resistance.

Continuing to refer to FIG. 1, the hinge-less coupling mechanism 106 of door assembly 100 generally comprises a door mounting bracket 132 and at least one pivot, such as the first and second pivot pins 134,136, shown. The door mounting bracket 132 is coupled to the side shield 110 at or about the top edge 114 of the mounting element aperture 112. In the example of FIG. 1, the door mounting bracket 132 is coupled to the top of the side shield 110 by a pair of fasteners, such as the bolts 133 and nuts 135, shown. It will, however, be appreciated that any known or suitable fastening mechanism could be employed to attach the door mounting bracket 132. It will also be appreciated that a number of washers (not shown), such as rubber or nylon washers, could optionally be additionally employed with the bolts 133 and nuts 135, in order to prevent undesired chafing or rubbing between the components of the door assembly 100. It will still further be appreciated that the holes which receive the fasteners (e.g., bolts 133) could be slightly elongated in order to provide some adjustment of the door assembly 100 when it is being assembled.

The door mounting bracket 132 shown and described herein includes a first end 138 and a second end 140 each having a protrusion, such as a tab 142, and an aperture 144. Accordingly, the first pivot pin 134 pivotably couples the first side 126 of the door 104 to protrusion 142 at aperture 144 at the first end 138 of the door mounting bracket 132, and the second pivot pin 136 pivotably couples second side 128 of the door 104 to aperture 144 of protrusion 142 of the second end 140 of the door mounting bracket 132. It will, however, be appreciated that any suitable alternative hinge-less pivotable door mounting configuration other than the door mounting bracket 132, pivot pin 134,136 arrangement shown and described, could be employed without departing from the scope of the invention. For example and without limitation, a single pivot pin (not shown) that extends between the first and second sides 126,128 of door 104 to engage both protrusions 142 at apertures 144 at the first and second ends 138,140 of the door mounting bracket 132, could alternatively be employed.

The door mounting bracket 132 also includes an upturned edge portion 137 (FIGS. 1, 3A, and 3B) which serves as a door stop for door 104 (FIG. 1), 204 (FIGS. 3A and 3B). More specifically, as best shown in FIG. 3A, the upturned edge portion 137 comprises a bent portion of the door mounting bracket 132 which is angled upward (from the perspective of FIGS. 1, 3A, and 3B) at an angle of about 15 degrees with respect to the plane of the base of the door mounting bracket 132, although it will be appreciated that in other embodiments of the invention the upturned edge portion 137 could have an angle of less than about 15 degrees or greater than about 15 degrees. In this manner, when the door 104 (FIG. 1), 204 is opened to the open position shown in phantom line drawing in FIG. 3A, stop edge 123 (FIG. 1), 223 (FIGS. 3A and 3B) of the top 122 (FIG. 1), 222 (FIGS. 3A and 3B) of the door 104,204 engages the upturned edge portion 137. Thus, the upturned edge portion 137 functions as a door stop to prevent the door 104,204 from over-rotating and causing one or more of the components (e.g., door cover 126,226, hood 108) of the assembly to interfere with one another and become damaged (e.g., without limitation, scraping or chipping the paint or other suitable coating of the components).

It will also be appreciated that while the components of the door assembly 100 are contemplated as being made from stainless steel, any other known or suitable weather-resistant material (e.g., without limitation, plastic), could be employed. It will further be appreciated that any known or suitable mechanism or method can be employed to secure the various components of the door assembly 100 together. For example and without limitation, the components may be mechanically fastened using fasteners, or they may be riveted, welded, or tox-locked, or a suitable combination of any of the foregoing.

In addition to the foregoing, the door assembly 100 (FIG. 1), 200 (FIGS. 2, 3A and 3B) also includes a number of other unique features which further lend to its superior weather resistance. For example, as shown in FIG. 1, one or more of the electrical components (e.g., circuit breaker 6; power receptacle 18) housed by the electrical power pedestal housing 4 protrudes outwardly from the housing opening 20 to the exterior of the housing 4, as shown. The door 104 of the hinge-less door assembly 100 is designed to accommodate this. Specifically, the cover 130 of the door 104 includes a sloped portion 146 such that when the door 104 is in the closed position, the sloped portion 146 of the door 104 extends from the top 122 of the door 104 at an angle about 20 degrees to about 50 degrees with respect to the vertical axis 30 of the electrical power pedestal housing 4. In this manner, the door 104 accommodates any component which protrudes from the housing opening 20. By way of example, the exemplary power receptacle 18 is angled downwardly (from the perspective of FIG. 1) and forms an angle of about 30 degrees or more with respect to the vertical axis 30 of the electrical power pedestal housing 4. This orientation serves a number of advantageous functions. Among them is the fact that any power conductor 8 (e.g., without limitation, a power cord or power cable 8 (shown in FIG. 2)) which is connected to the power receptacle 18, generally shares the same angle thus minimizing the stress on the power cable 8 (FIG. 2). Additionally, another unique feature which will now be discussed with respect to door 204 of FIGS. 2, 3A and 3B, enables the door 204 to remain in the closed position regardless of whether or not the power receptacle 18 of the electrical power pedestal 2 is in use.

Specifically, as shown in FIG. 2, the cover 230 of the door 204 includes at least one aperture 250 structured to receive the power cable 8. Two apertures 250 are shown in the cover 230 of door 204 in FIG. 2, with one power cable 8 being received through the aperture 250 at the bottom right (from the perspective of FIG. 2) of the door cover 230, and being coupled to power receptacle 18 (shown in simplified form in hidden line drawing in FIG. 2) behind door 204. Accordingly, the door 204 can be disposed in the closed position and be substantially weatherproof regardless of whether or not the power receptacle 18 is in use. In this manner, the door assembly 200 provides a vast improvement in weather-resistance over known door assemblies for electrical power pedestals which are typically required to be at least partially opened when the power receptacle 18 or other internal electrical components are in use.

A still further improvement of the door assembly 200 shown in FIG. 2, and also in FIG. 3B, is the inclusion of at least one animal shield 252 which is pivotably coupled to the inside surface of the door cover 230 at or about the apertures 250 (FIG. 2) therein. Specifically, the animal shield 252 generally comprises one or more pieces of stainless steel or other suitable material that forms a flap or door which is pivotable between a closed position, shown in hidden line drawing in FIGS. 2 and 3B, wherein the animal shield 252 blocks the aperture 250 (see, for example, animal shield 252 blocking the aperture 250 at the bottom left (from the perspective of FIG. 2) of door cover 230 in FIG. 2) to resist undesired access to the electrical components (e.g., power receptacle 18) covered by the door 204. As shown, for example with respect to the animal shield 252 at the bottom right (from the perspective of FIG. 2) of door cover 230 in FIG. 2, the animal shield 252 pivots upwardly (from the perspective FIG. 2) in order to provide access for power cable 8 to be received through aperture 250 (see also, animal shield 252 shown in the open position in phantom line drawing in FIG. 3B). Accordingly, when the door 204 is in the closed position and the power receptacle 18 is not in use, the animal shield 252 is closed and blocks the corresponding aperture 250 in the door cover 230. Additionally, when the door 204 is in the closed position, the animal barrier 252 cannot be moved (i.e., pivoted) upwardly to the open position because it interferes with, or is blocked by, the mounting element 102 (see, for example, animal shield 252 of FIG. 3B, shown in phantom line drawing, which protrudes past the substantially planar edge 248 of door 204). Thus, in view of the foregoing, an animal (e.g., without limitation, a rodent) cannot enter the electrical power pedestal housing 4 through aperture 250 because the animal shield 252 blocks it from doing so.

In order for the power cable 8 to be inserted through aperture 250 as shown in FIG. 2, the door 204 must first be opened and the power cable 8 must be plugged into the power receptacle 18. Then, as the door 204 is moved toward the closed position, the animal shield 252 engages the power cable 8 and pivots upwardly (from the perspective of FIGS. 2 and 3B) to the open positioned shown in hidden line drawing in FIG. 2 and in phantom line drawing in FIG. 3B, to permit the door 204 to fully close and be substantially weatherproof, despite the power receptacle 18 (FIG. 2) being in use (e.g., receiving the power cable 8 (FIG. 2)).

Still further advantageous features of the door assembly 200 include the fact that the door 204 is lockable when it is disposed in the closed position of FIG. 2. Specifically, the mounting element 102 of the door assembly 200 includes a first locking element 160, and the door 204 includes a second locking element 262 (also shown in FIGS. 3A and 3B; see also first locking element 160 and second locking element 162 of FIG. 1). The second locking element 262 of the door 204 receives the first locking element 160 when the door 204 is closed, at which point the first and second locking elements 160,262 can receive a lock, such as the padlock 300, shown in FIG. 2. Accordingly, the door assembly 200 can be locked to prevent undesired access to the electrical components (e.g., without limitation, power receptacle 18) housed by the electrical power pedestal housing 4. It will, of course, be appreciated that any known or suitable alternative locking mechanism could be employed other than padlock 300, without departing from the scope of the invention.

In the example of FIG. 3A, the door assembly 200 further comprises an optional biasing member 170 which is coupled to the door 204, and one of the mounting element 102 and the hinge-less coupling mechanism 106. The biasing element 170 biases the door 204 towards the closed position, shown in solid line drawing, in order to resist the unintentional opening of the door 204 caused, for example, by a strong wind. In the example of FIG. 3A, the biasing member comprises a spring 170 coupled at one end to the interior of the cover 230 of the door assembly door 204, and at the other end to the hinge-less coupling mechanism 106 of the door assembly 200.

FIG. 3A also shows, in phantom line drawing, the unique ability of the door 204 to open to a substantial angle with respect to the vertical axis 30 of the electrical power pedestal housing 4. This is possible despite the aforementioned close proximity of the hood 108 to the top 222 of the door 204 of the door assembly 200. More specifically, the door 204 includes a substantially planar edge 248 (see also, substantially planar edge 148 of door 104 in FIG. 1). The substantially planar edge 148 is flush with at least one of the mounting element 102 of door assembly 204 and the electrical power pedestal housing 4 when the door 204 is closed, as shown in solid line drawing in FIG. 3A. The unique design and configuration of the door assembly 200 enables the door 204 to open (shown in phantom line drawing in FIG. 3A) such that the substantially planar edge 248 of the door 204 forms an angle with respect to the vertical axis 30 of the electrical power pedestal housing 4 of at least about 90 degrees. In the example of FIG. 3A, the door 204 is shown in phantom line drawing in an open position with the substantially planar edge 248 of the door 204 being disposed at an angle greater than 90 degrees (e.g., about 120 degrees) with respect to the vertical axis 30. In this manner, when the door 204 is open, the door assembly 200 advantageously provides straight-in access to the opening 20 (FIG. 1) of the electrical power pedestal housing 4 and the electrical components 6,8,10,12,14,16,18 (FIG. 1) housed thereby.

It will also be appreciated that the housing 4 of the electrical power pedestal 2 may optionally further include at least one component which is not electrical. For example, in the embodiment of FIG. 2, the electrical power pedestal 2 includes a water supply nozzle 400 and a storage bracket 500. The storage bracket 500 could be used, for example, to store a water hose (not shown), a rope (not shown), a life-preserver (not shown), or a power cord (not shown). These components, and others, can be disposed on the exterior of the housing of the electrical power pedestal 2 in any known or suitable configuration.

Accordingly, the electrical power pedestal 2 and hinge-less door assembly 100,200 therefore are substantially weatherproof, and are particularly well suited for outdoor applications wherein the electrical power pedestal 2 could be subject to harsh weather conditions (e.g., without limitation, rain showers; sleet; snow; freezing conditions). Therefore, the electrical power pedestal 2 provides reliable plug-in electrical power and connectivity (e.g., without limitation, telephone service; internet service; cable television) in a wide variety of outdoor applications (e.g., without limitation, marinas; RV parks; campgrounds).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to scope of invention which is to be given the full breadth of the claims appended and any and all equivalents thereof.

What is claimed is:

1. A door assembly for an outdoor electrical enclosure, said outdoor electrical enclosure including a housing having an exterior, and at least one electrical component housed by said housing, said housing having an opening for providing access to said at least one electrical component from the exterior of said housing, said door assembly comprising: a mounting element structured to be coupled to said housing of said outdoor electrical enclosure at or about said opening of said housing; a door structured to cover said opening of said housing; wherein said door includes a top, a bottom, a first side, a second side, and a cover; and a hinge-less coupling mechanism pivotably coupling said door to said mounting element, wherein said door is operable among an open position in which access to said at least one electrical component is provided through said opening of said housing, and a closed position in which said door assembly provides substantial protection for said at least one electrical component housed by said housing.

2. The door assembly of claim 1 wherein said mounting element comprises at least one weather shield; and wherein said at least one weather shield protrudes outwardly from said mounting element and said housing of said outdoor electrical enclosure to which said mounting element is coupled, in order to at least partially shield at least one of said opening of said housing of said outdoor electrical enclosure, said door, and said hinge-less coupling mechanism.

3. The door assembly of claim 2 wherein said at least one weather shield comprises a hood coupled to said mounting element at or about said hinge-less coupling mechanism; and wherein said hood at least partially overlays said hinge-less coupling mechanism and a portion of said door in order to resist the undesired entry of moisture or the undesired accumulation of ice.

4. The door assembly of claim 2 wherein said opening of said housing of said outdoor electrical enclosure is generally rectangular in shape and includes a top edge, a bottom edge, and first and second side edges; wherein said mounting element includes an aperture corresponding to said generally rectangular opening of said housing, said aperture including a top edge, a bottom edge, and first and second side edges; wherein said at least one weather shield comprises a side shield coupled to said mounting element at or about at least one of the first and second side edges of said aperture of said mounting element and said top edge of said aperture of said mounting element; and wherein said side shield is structured to shield said opening of said housing and said at least one electrical component housed by said housing.

5. The door assembly of claim 4 wherein when said door is in said closed position, at least one of said top of said door and said first side and said second side of said door overlap said side shield in order to provide weather-resistance.

6. The door assembly of claim 4 wherein said hinge-less coupling mechanism comprises a door mounting bracket and at least one pivot; wherein said door mounting bracket is coupled to said side shield at or about said top edge of said aperture of said mounting element; wherein said door mounting bracket includes a first end and a second end; and wherein said pivot pivotably couples said door to said first end and said second end of said door mounting bracket.

7. The door assembly of claim 6 wherein the first end and the second end of said door mounting bracket each include a protrusion having an aperture; wherein said at least one pivot comprises a first pivot pin and a second pivot pin; and wherein said first pivot pin pivotably couples the first side of said door to the aperture of said protrusion of the first end of said door mounting bracket, and said second pivot pin pivotably couples the second side of said door to the aperture of said protrusion of the second end of said door mounting bracket.

8. The door assembly of claim 6 wherein said door mounting bracket further comprises an upturned edge portion; wherein said door further comprises a stop edge; and wherein when said door is disposed in said open position, said stop edge of said door engages said upturned edge portion of said door mounting bracket.

9. The door assembly of claim 1 wherein said outdoor electrical enclosure further comprises at least one protrusion protruding outwardly from said opening of said housing to the exterior of said housing; wherein said housing of said outdoor electrical enclosure has a vertical axis; wherein said cover of said door comprises a sloped portion; and wherein when said door is in said closed position, said sloped portion of said door extends from said top of said door at an angle of about 20 degrees to about 50 degrees with respect to said vertical axis of said housing, in order to accommodate said at least one protrusion.

10. The door assembly of claim 9 wherein said door further comprises a substantially planar edge; wherein when said door is disposed in said closed position, said substantially planar edge of said door is flush with at least one of said mounting element and said housing of said outdoor electrical enclosure; and wherein when said door is disposed in said open position, said substantially planar edge of said door forms an angle with respect to said vertical axis of said housing of at least about 90 degrees, thereby providing straight-in access to said opening of said housing.

11. The door assembly of claim 1 wherein said at least one electrical component comprises at least one power receptacle structured to receive a power conductor; and wherein said cover includes at least one aperture structured to receive said power conductor in order that said door remains in said closed position.

12. The door assembly of claim 11 wherein said door further comprises at least one animal shield pivotably coupled to said cover of said door at or about a corresponding one of said at least one aperture of said cover; wherein when said door is disposed in said closed position and said power conductor is not disposed in said at least one aperture of said cover of said door, said at least one animal shield covers said at least one aperture of said cover in order to resist undesired access to said at least one power receptacle through said at least one aperture of said cover; and wherein said at least one animal shield moves to receive said power conductor through said at least one aperture of said cover when said power conductor is plugged into said at least one power receptacle.

13. The door assembly of claim 1 wherein said door is lockable when said door is disposed in said closed position; wherein said mounting element comprises a first locking element; wherein said door comprises a second locking element; wherein said second locking element of said door is structured to receive said first locking element when said door is closed; and wherein when said door is closed, said first locking element and said second locking element are structured to receive a lock in order to prevent undesired access to said at least one electrical component housed by said housing of said outdoor electrical enclosure.

14. The door assembly of claim 1 further comprising a biasing member coupled between said door and one of said mounting element and said hinge-less coupling mechanism;

and wherein said biasing member biases said door towards said closed position in order to prevent said door from unintentionally opening.

15. The door assembly of claim 1 wherein at least one of said housing of said outdoor electrical enclosure, said mounting element, said door, and said hinge-less coupling mechanism is made from stainless steel.

16. An outdoor electrical enclosure comprising:
a housing having an exterior and including an opening; at least one electrical component housed by said housing and being accessible from the exterior of said housing, through said opening; and a door assembly for covering said opening, said door assembly comprising: a mounting element coupled to said housing at or about said opening of said housing, a door which includes a top, a bottom, a first side, a second side, and a cover, operable among an open position in which access to said at least one electrical component is provided through said opening of said housing, and a closed position in which said door assembly provides substantial protection for said at least one electrical component housed by said housing, and a hinge-less coupling mechanism pivotably coupling said door to said mounting element.

17. The outdoor electrical enclosure of claim 16 wherein said mounting element comprises at least one weather shield; and wherein said at least one weather shield protrudes outwardly from said mounting element and said housing of said outdoor electrical enclosure to which said mounting element is coupled, in order to at least partially shield at least one of said opening of said housing of said outdoor electrical enclosure, said door, and said hinge-less coupling mechanism.

18. The outdoor electrical enclosure of claim 17 wherein said at least one weather shield comprises a hood coupled to said mounting element at or about said hinge-less coupling mechanism; and wherein said hood at least partially overlays said hinge-less coupling mechanism and a portion of said door in order to resist the undesired entry of moisture and to resist the undesired accumulation of ice.

19. The outdoor electrical enclosure of claim 17 wherein said opening of said housing of said outdoor electrical enclosure is generally rectangular in shape and includes a top edge, a bottom edge, and first and second side edges; wherein said mounting element includes an aperture corresponding to said generally rectangular opening of said housing, said aperture including a top edge, a bottom edge, and first and second side edges; wherein said at least one weather shield comprises a side shield coupled to said mounting element at or about at least one of the first and second side edges of said aperture of said mounting element and said top edge of said aperture of said mounting element; and wherein said side shield shields said opening of said housing and said at least one electrical component housed by said housing.

20. The outdoor electrical enclosure of claim 19 wherein when said door is in said closed position, at least one of said top of said door and said first side and said second side of said door overlap said side shield in order to provide weather resistance.

21. The outdoor electrical enclosure of claim 17 wherein said hinge-less coupling mechanism comprises a door mounting bracket and at least one pivot; wherein said door mounting bracket is coupled to said side shield at or about said top edge of said aperture of said mounting element; wherein said door mounting bracket includes a first end and a second end; and wherein said pivot pivotably couples said door to said first end and said second end of said door mounting bracket.

22. The outdoor electrical enclosure of claim 21 wherein the first end and the second end of said door mounting bracket each include a protrusion having an aperture; wherein said at least one pivot comprises a first pivot pin and a second pivot pin; and wherein said first pivot pin pivotably couples the first side of said door to the aperture of said protrusion of the first end of said door mounting bracket, and said second pivot pin pivotably couples the second side of said door to the aperture of said protrusion of the second end of said door mounting bracket.

23. The outdoor electrical enclosure of claim 16 wherein said outdoor electrical enclosure further comprises at least one protrusion protruding outwardly from said opening of said housing to the exterior of said housing; wherein said housing of said outdoor electrical enclosure has a vertical axis; wherein said cover of said door comprises a sloped portion; and wherein when said door is in said closed position, said sloped portion of said door extends from said top of said door at an angle of about 20 degrees to about 50 degrees with respect to said vertical axis of said housing, in order to accommodate said at least one protrusion.

24. The outdoor electrical enclosure of claim 23 wherein said door further comprises a substantially planar edge; wherein when said door is disposed in said closed position, said substantially planar edge of said door is flush with at least one of said mounting element and said housing of said outdoor electrical enclosure; and wherein when said door is disposed in said open position, said substantially planar edge of said door forms an angle with respect to said vertical axis of said housing of at least about 90 degrees, thereby providing straight-in access to said opening of said housing.

25. The outdoor electrical enclosure of claim 16 wherein said at least one electrical component comprises at least one power receptacle structured to receive a power conductor; and wherein said cover includes at least one aperture structured to receive said power conductor in order that said door remains in said closed position.

26. The outdoor electrical enclosure of claim 25 wherein said door further comprises at least one animal shield pivotably coupled to said cover of said door at or about a corresponding one of said at least one aperture of said cover; wherein when said door is disposed in said closed position and said power conductor is not disposed in said at least one aperture of said cover of said door, said at least one animal shield covers said at least one aperture of said cover in order to resist the undesired access to said at least one power receptacle through said at least one aperture of said cover; and wherein said at least one animal shield moves to receive said power conductor through said at least one aperture of said cover when said power conductor is plugged into said at least one power receptacle.

27. The outdoor electrical enclosure of claim 16 wherein said door is lockable when said door is disposed in said closed position; wherein said mounting element comprises a first locking element; wherein said door comprises a second locking element; wherein said second locking element of said door receives said first locking element when said door is closed; and wherein when said door is closed, said first locking element and said second locking element are structured to receive a lock in order to prevent undesired access to said at least one electrical component housed by said housing of said outdoor electrical enclosure.

28. The outdoor electrical enclosure of claim 16 further comprising a biasing member coupled between said door and one of said mounting element and said hinge-less coupling mechanism; and wherein said biasing member biases said door towards said closed position in order to prevent said door from unintentionally opening.

29. The outdoor electrical enclosure of claim 16 wherein said at least one electrical component housed by said housing of said electrical power pedestal comprises at least one electrical component selected from the group consisting of a circuit breaker, a power conductor, a telephone service line, an internet service line, a television cable, a light fixture, and a power receptacle; and wherein the exterior of said housing of said electrical power pedestal further comprises at least one component selected from the group consisting of a water supply nozzle and a storage bracket.

* * * * *